(12) United States Patent
Lee et al.

(10) Patent No.: US 7,710,850 B2
(45) Date of Patent: May 4, 2010

(54) METHOD AND APPARATUS FOR REPRODUCING DATA OF SUPER RESOLUTION INFORMATION STORAGE MEDIUM

(75) Inventors: Jin-kyung Lee, Suwon-si (KR); Joo-ho Kim, Yongin-si (KR); Chong-sam Chung, Hwaseong-si (KR); In-oh Hwang, Seongnam-si (KR); Kiu-hae Jung, Suwon-si (KR); Hyun-ki Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 937 days.

(21) Appl. No.: 11/168,336

(22) Filed: Jun. 29, 2005

(65) Prior Publication Data

US 2006/0002281 A1    Jan. 5, 2006

(30) Foreign Application Priority Data

Jun. 30, 2004   (KR) .................... 10-2004-0050787
Mar. 2, 2005    (KR) .................... 10-2005-0017249
Mar. 3, 2005    (KR) .................... 10-2005-0017576

(51) Int. Cl.
*G11B 7/00*    (2006.01)
(52) U.S. Cl. ............... 369/116; 369/44.37; 369/59.1; 369/53.1; 369/124.01; 369/124.03; 369/112.12
(58) Field of Classification Search ............. 369/44.37, 369/59.1, 53.1, 116, 124.01, 124.03, 112.12
See application file for complete search history.

(56) References Cited

U.S. PATENT DOCUMENTS 4,888,759 A * 12/1989 Hazel et al. ............ 369/112.16

(Continued)

FOREIGN PATENT DOCUMENTS

JP    6251396    9/1994

(Continued)

OTHER PUBLICATIONS

Machine Translation of Japanese publication No. 09120564 by Matsumoto Kiyoshi on Oct. 23, 1995.*

(Continued)

*Primary Examiner*—Wayne R Young
*Assistant Examiner*—Linh T Nguyen
(74) *Attorney, Agent, or Firm*—NSIP Law

(57) ABSTRACT

A data reproducing method reproducing data recorded in a super resolution information storage medium in a form of marks having magnitudes less than a resolving power of an incident light beam, and an apparatus thereof. The data reproducing method includes irradiating a first beam having a resolving power causing a super resolution phenomenon and a second beam having a resolving power not causing a super resolution phenomenon into different places on the information storage medium, detecting a first reproduction signal based on the first beam and a second reproduction signal based on the second beam, and compensating for and calculating a temporal delay between the first reproduction signal and the second reproduction signal. Therefore, a signal reflected from a peripheral area of a reproduction beam spot other than a super resolution area can be excluded, thereby improving reproduction signal characteristics.

36 Claims, 14 Drawing Sheets

U.S. PATENT DOCUMENTS

| | | | |
|---|---|---|---|
| 5,410,531 A | | 4/1995 | Tsujioka |
| 5,530,685 A | * | 6/1996 | Katayama et al. ........ 369/13.14 |
| 5,615,180 A | * | 3/1997 | Mieda et al. ............. 369/13.45 |
| 5,701,286 A | * | 12/1997 | Sato ...................... 369/112.07 |
| 5,835,469 A | * | 11/1998 | Maeda et al. ................ 369/100 |
| 5,856,965 A | * | 1/1999 | Tsuchiya et al. ............ 369/53.2 |
| 6,115,345 A | * | 9/2000 | Kato et al. ............... 369/112.1 |
| 6,459,669 B1 | * | 10/2002 | Fujita et al. ................. 369/59.1 |
| 6,538,968 B1 | * | 3/2003 | Yamaguchi et al. ...... 369/47.53 |
| 6,556,516 B1 | * | 4/2003 | Shimazaki et al. ....... 369/13.02 |
| 2003/0039196 A1 | * | 2/2003 | Nakamura et al. ..... 369/112.01 |

FOREIGN PATENT DOCUMENTS

| | | |
|---|---|---|
| JP | 9120564 | 5/1997 |
| WO | WO9526548 | 10/1995 |

OTHER PUBLICATIONS

Search Report in International Patent Application No. PCT/KR2005/002034 on Sep. 26, 2005.

* cited by examiner

METHOD AND APPARATUS FOR REPRODUCING DATA OF SUPER RESOLUTION INFORMATION STORAGE MEDIUM

CROSS-REFERENCE TO RELATED APPLICATIONS

This application claims the priority of Korean Patent Applications No. 2004-50787, filed on Jun. 30, 2004, 2005-17249, filed on Mar. 2, 2005, and 2005-17576, filed on Mar. 3, 2005, in the Korean Intellectual Property Office, the disclosures of which are incorporated herein in their entirety by reference.

BACKGROUND OF THE INVENTION

1. Field of the Invention

An aspect of the present invention relates to a method and apparatus of reproducing data recorded on a super-resolution information storage medium, and more particularly, to a method and apparatus of reproducing data recorded on a super-resolution information storage medium which can improve characteristics of a reproduced signal by removing inter-symbolic interference (ISI) from the super-resolution information storage medium.

2. Description of the Related Art

An optical recording medium is used as an information storage medium of an optical pickup device for recording and/or reproducing information in a non-contact type. With the progress of the industrial development, information recording media having greater recording density are highly in demanded. Accordingly, development of optical recording media capable of reproducing recording marks having a spot diameter less than a laser beam spot using a super resolution phenomenon is under way.

In general, when a wavelength of light for reproducing data recorded on a recording medium is $\lambda$, and a numerical aperture of an objective lens is NA, the limit of reproducible resolution becomes $\lambda/4NA$. In other words, since light emitted from a light source is unable to distinguish recording marks having a diameter smaller than $\lambda/4NA$ from others, it is very often that such data is not reproducible.

However, a recording mark exceeding such a resolving power limit may be reproduced, which is referred to as a super resolution phenomenon. Nowadays, investigation of causes of the super resolution phenomenon and research and development into the super resolution phenomenon are under way. Since super resolution enables reproduction of a recording mark exceeding a resolving power limit, a super resolution information storage medium can markedly realize demands for high density and large storage capacity.

Requirements for commercial use of super-resolution information storage media are that the information storage media satisfy basic recording and reproducing features as storage media. In particular, super resolution information storage media utilize recording beams and reproduction beams having relatively high power compared to conventional information storage media. Furthermore, super resolution information storage media have major issues with reproduction signal characteristics, such as carrier-to-noise ratio (CNR), jitter or RF signal, and with the realization of stable reproduction signals. In order to place super resolution information storage medium into practice, it is a prerequisite for the super resolution information storage medium to satisfy reproduction signal characteristics.

An area of a reproduction beam spot on a super resolution information recording medium where super resolution phenomenon occurs will now be described with reference to FIG. 1.

As shown in FIG. 1, marks 110 are recorded on a track 100 of a super resolution information storage medium, and a change in the temperature distribution or optical property occurs within a beam spot 120 landing on a super resolution layer due to a difference in local light intensity. Thus, marks 110 beyond a resolving power limit may also be reproduced. In other words, a change in the temperature distribution or optical characteristic occurs at a partial region of the beam spot 120, and no changes occur at a peripheral area 140 of the partial region. The partial region where such a change occurs, which will be referred to as a super resolution area 130 hereinafter, may be a central portion, as shown in FIG. 1. Such areas where a change in optical characteristics occurs may be consecutive or alternate.

Actually, there are many reports indicating that a CNR large enough to be applied to a practical medium was obtained from marks of the same lengths that are smaller than a resolving power by super resolution reproducing operations using various super-resolution materials. However, actual optical recording is executed not by recording marks of the same lengths at regular intervals but by recording marks of the same lengths at irregular intervals (i.e., a mark position detecting method) or by recording marks of different lengths at irregular intervals (i.e., a mark length detection method). Particularly, in CDs or DVDs, marks of various lengths ranging between 3T and 11T (where T denotes a clock frequency) are complexly recorded. However, none of the above-described super resolution techniques has yet succeeded in reproducing such a complex signal, because signals reflected from an optical recording medium contain not only signals reflected from the area of the beam spot where optical characteristics change but also signals reflected from a peripheral area of the area where optical characteristics change. If there is no signal from the peripheral area, the size of an effective beam spot is substantially reduced, so that a complex signal can be reproduced. However, in the above-described super resolution techniques, a difference between the area where optical characteristics change and the peripheral area is used, and since the difference is small, signals reflected from the peripheral area serve as an obstacle to the spot size reduction. This results in ISI (Inter Symbolic Interference) that occurs when a series of marks are reproduced, so that a complex signal cannot be reproduced with a high resolution.

FIG. 2A illustrates a recording pattern of marks recorded on an information storage medium, and FIG. 2B illustrates an RF signal corresponding to reproduced marks of the recording pattern shown in FIG. 2A. When a wavelength of a laser beam is 405 nm, an NA thereof is 0.85, and a resolving power thereof is approximately 75 nm, the recording pattern is based on a combination of a mark of approximately 75 nm, which is smaller than a resolving power, a mark of approximately 300 nm, which is greater than the resolving power, and a space between the two marks. In the reproduction signal shown in FIG. 2B, when a 300 nm long mark or space is present around a beam spot, a 75 nm long mark is affected by the 300 nm long mark and space so that it is not possible to clearly detect the 75 nm long mark. Areas having 75 nm long marks are indicated by A, B, C, D, E, and F. Referring to FIGS. 2A and 2B, levels of the reproduction signal for the areas A, B, C, D, E, and F are different according to the numbers of 75 nm long marks and spaces. Further, each of the levels of the reproduction signal for the areas A, B, C, D, E, and F is not constant but variable depending on the surrounding conditions of the 75 nm long mark.

The above-stated problems are caused due to ISI of signals from the peripheral area 140 of the beam spot.

SUMMARY OF THE INVENTION

According to an aspect of the present invention, there is provided a method and apparatus for accurately reproducing recorded data preventing Inter Symbolic Interference (ISI) by removing reproduction signals from a peripheral area of a super resolution area where a change in the temperature distribution or optical characteristics occurs when a reproduction beam is radiated onto a super resolution information storage medium.

According to an aspect of the present invention, there is provided a method of reproducing data recorded in a super resolution information storage medium in marks having magnitudes less than a resolving power of an incident light beam, the method including irradiating a first beam having a resolving power causing a super resolution phenomenon and a second beam having a resolving power not causing a super resolution phenomenon on the information storage medium; detecting a first reproduction signal based on the first beam and a second reproduction signal based on the second beam; and compensating for and calculating a temporal delay between the first reproduction signal and the second reproduction signal.

According to another aspect of the present invention, the calculating operation may include obtaining a differential signal between the first reproduction signal and the second reproduction signal. The first beam and the second beam may be irradiated at places on the same track with a time delay.

According to another aspect of the present invention, the irradiating operation may include splitting a beam emitted from a single light source into the first beam and the second beam using a diffraction element. In the operation of splitting the beam emitted from the single light source, a $+k^{th}$-order diffracted beam among a plurality of diffracted beams produced by the diffraction element may be used as the first beam, and a $-k^{th}$-order diffracted beam may be used as the second beam. Alternatively, the $-k^{th}$-order diffracted beam among the plurality of diffracted beams produced by the diffraction element may be used as the first beam, and the $+k^{th}$-order diffracted beam may be used as the second beam. The diffraction element may be a blaze-type grating element.

According to another aspect of the present invention, the irradiating operation may include emitting the first beam and the second beam from independent light sources including a first light source and a second light source, respectively.

According to another aspect of the present invention, there is provided a method of reproducing data recorded in a super resolution information storage medium in the form of marks having magnitudes less than a resolving power of an incident light beam, the method including: irradiating a first beam of super resolution power into the information storage medium; irradiating a plurality of second beams of non-super resolution power into a place on the information storage medium that is irradiated by the first beam, with a predetermined temporal delay; and detecting a final reproduction signal based on a first reproduction signal for the first beam and a second reproduction signal for the second beam.

According to another aspect of the present invention, the detecting operation may include obtaining a differential signal between the first reproduction signal and the second reproduction signal.

According to another aspect of the present invention, the detecting operation may further include compensating for the predetermined time delay between the first reproduction signal and the second reproduction signal. Alternatively, the detecting operation may further include compensating for the predetermined time delay so that jitter or bER of the final reproduction signal can be minimized. Alternatively, the detecting operation may further include compensating for the predetermined time delay using a difference between the time required to reproduce pre-pits or identification information, which is not used as user data, using the first beam, and the time required to reproduce the pre-pits or identification information using the second beam. Alternatively, the detecting operation may further include compensating for the predetermined time delay using a wobble signal.

According to another aspect of the present invention, there is provided an apparatus for reproducing data recorded in a super resolution information storage medium in the form of marks having magnitudes less than a resolving power of an incident light beam, the apparatus including an optical pickup irradiating a first beam having a resolving power causing a super resolution phenomenon and a second beam having a resolving power not causing a super resolution phenomenon on the information storage medium; a signal processor detecting a first reproduction signal for the first beam and a second reproduction signal for the second beam, compensating for a temporal delay between the first and second reproduction signals, and operating the first reproduction signal and the second reproduction signal; and a controller controlling the optical pickup using a signal received from the signal processor.

According to another aspect of the present invention, there is provided an apparatus reproducing data recorded in a super resolution information storage medium in the form of marks having magnitudes less than a resolving power of an incident light beam, the apparatus including an optical pickup irradiating a first beam of super resolution power into the information storage medium and a plurality of second beams not having a super resolution power into the area on the information storage medium irradiated by the first beam; a signal processor detecting a final reproduction signal based on a first reproduction signal for the first beam and a second reproduction signal for the second beam; and a controller controlling the optical pickup using a signal received from the signal processor.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
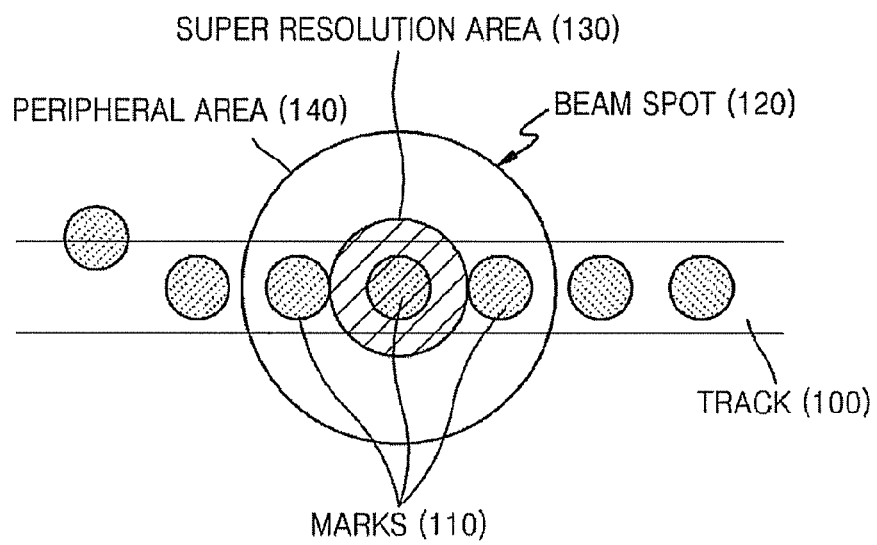
FIG. 1 illustrates an area where a super resolution phenomenon occurs at a reproduction beam spot radiated onto a super resolution information storage medium.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

The data reproducing method according to an aspect of the present invention is applied to a super resolution information storage medium configured to reproduce information recorded in a recording mark having a magnitude beyond a limit of a resolving power.

Prior to a detailed explanation of the data reproducing method according to an aspect of the present invention, an exemplary super resolution information storage medium will first be described.

Figure 3:
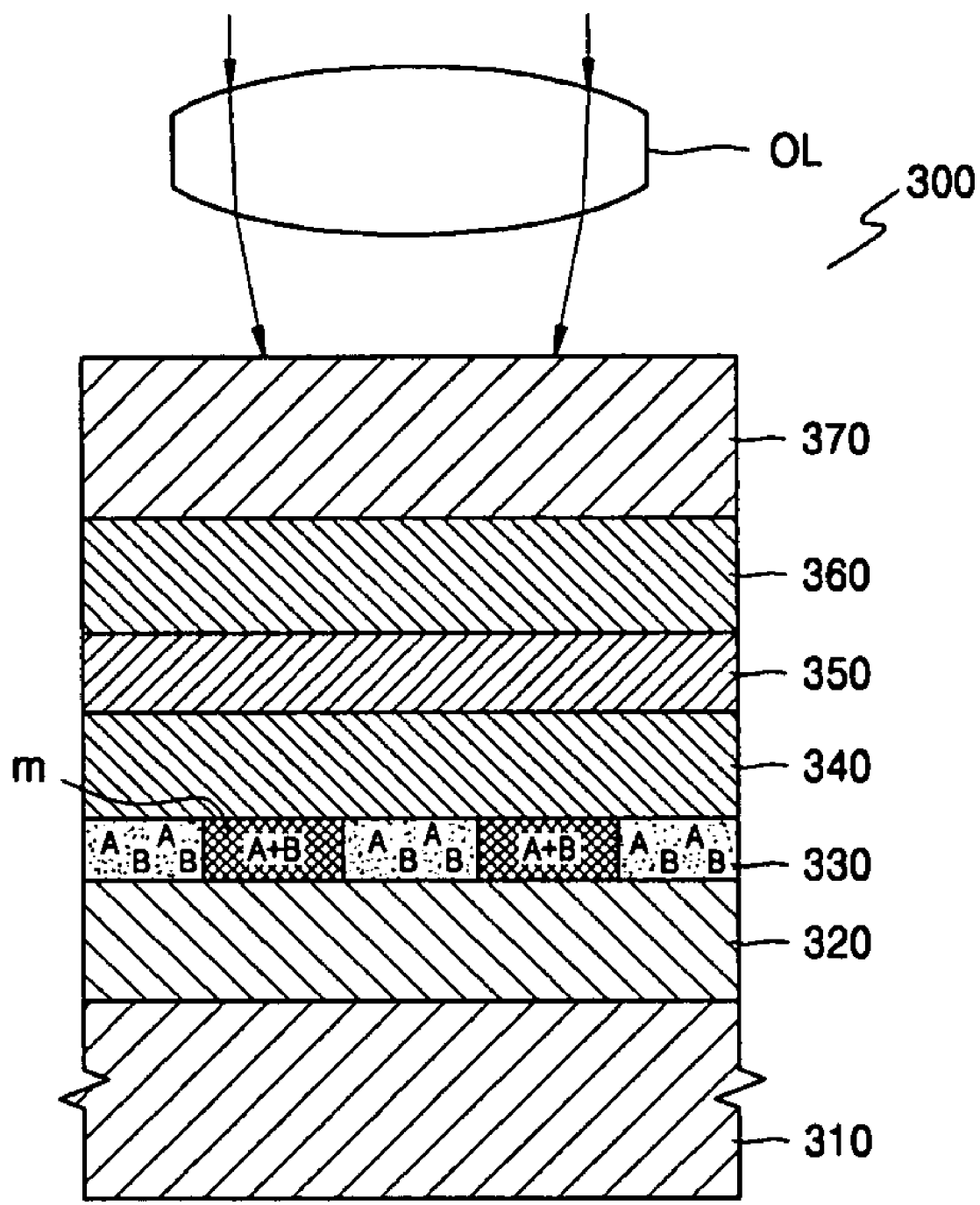
FIG. 3 is a cross-sectional view schematically showing an example of a super resolution information storage medium to which a reproducing method according to an aspect of the present invention is applied.

Referring to FIG. 3, a super resolution information storage medium includes a substrate 310, and a first dielectric layer 320, a recording layer 330, a second dielectric layer 340, a super resolution reproduction layer 350, a third dielectric layer 360 and a cover layer 370 sequentially formed on the substrate 310. Here, beams used in recording/reproducing information are focused on an objective lens (OL) and incident upon the super resolution information storage medium via the cover layer 370.

The substrate 310 is preferably made of at least one material selected from the group consisting of polycarbonate, polymethylmethacrylate (PMMA), amorphous polyolefin (APO) and glass, and preferably, but not necessarily, has a reflective film for reflecting an incident beam coated on one surface of the substrate 310, that is, a surface facing the first dielectric layer 320.

The first through third dielectric layers 320, 340, and 360 control optical and/or thermal characteristics of the super resolution information storage medium. The cover layer 370 covers layers formed on the substrate 310, including the recording layer 330 and the super resolution reproduction layer 350. Here, the first through third dielectric layers 320, 340, and 360 and the cover layer 370 are not essential constituents of the super resolution information storage medium. Of course, information can be reproduced even if these layers are not formed in the super resolution information storage medium.

The first through third dielectric layers 320, 340, and 360 are preferably, but not necessarily, made of at least one material selected from the group consisting of oxides, nitrides, carbides, sulfides, and fluorides. In other words, the first through third dielectric layers 320, 340, and 360 are preferably, but not necessarily, at least one material selected from the group consisting of silicon oxide (SiOX), magnesium oxide ($MgO_x$), aluminum oxide ($AlO_x$), titanium oxide ($TiO_x$), vanadium oxide ($VO_x$), chromium oxide ($CrO_x$), nickel oxide (NiOx), zirconium oxide ($ZrO_x$), germanium oxide ($GeO_x$), zinc oxide ($ZnO_x$), silicon nitride (SiNX), aluminum nitride (AlNx), titanium nitride ($TiN_x$), zirconium nitride ($ZrN_x$), germanium nitride ($GeN_x$), silicon carbide (SiC), zinc sulfide (ZnS), a compound of zinc sulfide-silicon dioxide ($ZnS-SiO_2$), and magnesium fluoride ($MgF_2$).

The recording layer 330 has such a structure that a recording mark (m) recorded by an incident beam with a predetermined recording power level has a rectangular cross section or a cross section which is substantially the same as a rectangular shape. Here, the recording mark (m) includes a mark having a magnitude no greater than the resolving power of an optical pickup used for reproduction.

To repeatedly reproduce data using a super resolution phenomenon, a chemical reaction temperature Tw of the recording layer 330 is higher than a temperature Tr of the super resolution reproduction layer 350 at which the super resolution phenomenon occurs.

Therefore, to produce the recording mark (m), the recording layer 330 necessarily has a single-layered structure having a mixture of two or more materials (e.g., materials A and B shown in FIG. 3) having different physical properties and chemically reacting with each other at a predetermined temperature.

For example, the recording layer 330 exists in the form of a film having the materials A and B mixed therein before data recording, that is, before a chemical reaction between the materials A and B. When a recording beam having a predetermined power level is irradiated into the recording layer 330, the chemical reaction between the materials A and B occurs at a beam-spot-landed region of the recording layer 330, and the state of the recording layer changes from the mixture of the materials A and B into a compound A+B having a different physical property from the mixture of the materials A and B. The compound A+B produces the recording mark (m), which has different reflectivity from a recording mark in another region.

Examples of the material A include tungsten (W), and examples of the material B include silicon (Si), based on the facts that, in the case of employing Ge—Sb—Te as materials of a super resolution reproduction layer, a super resolution phenomenon occurs at approximately 350° C. during reproduction, and recording must be performed at the reproduction temperature. In other words, a W—Si alloy has a reaction temperature of approximately 600° C., it is not affected by reproduction power.

When W and Si are selected, the recording layer 330 is preferably, but not necessarily, formed by mixing the two materials such that the ratio of the number of W atoms to the number of Si atoms is 1 to 2. In this case, a $WSi_2$ compound is produced by a chemical reaction occurring at a predetermined region of the recording layer 330 on which a beam of recording power irradiates. The above-noted ratio of the numbers of W and Si atoms, that is, 1:2, is provided for illustration only and the ratio is not limited thereto.

Although W and Si have been described as materials of the recording layer, these two materials are provided for illustration only and any two or more materials can be selected from the group consisting of materials capable of chemically reacting at a temperature higher than the reproduction temperature within a range in which recording using a laser beam can be performed. For example, the recording layer may include at least two materials selected from the group consisting of vanadium (V), chromium (Cr), cobalt (Co), nickel (Ni), copper (Cu), germanium (Ge), selenium (Se), niobium (Nb), molybdenum (Mo), silver (Ag), tin (Sn), antimony (Sb), tellurium (Te), titanium (Ti), zirconium (Zr) and lanthane-based elements.

The super resolution reproduction layer 350 is a layer made of a phase change material which experiences a change in the temperature distribution or optical characteristics at some regions of the incident beam spot. In other words, the super resolution reproduction layer 350 is preferably, but not necessarily, formed of a calcogenide phase change material containing at least one selected from the group consisting of sulfur (S), selenium (Se), and tellurium (Te). For example, the super resolution reproduction layer 350 contains at least one selected from the group consisting of selenium-sulfur (Se—S), selenium-tellurium (Se—Te), sulfur-tellurium (S—Te), phosphorus-sulfur (P—S), phosphorus-tellurium (P—Te), phosphorus-selenium (P—Se), arsenic-sulfur (As—S), arsenic-selenium (As—Se), arsenic-tellurium (As—Te), antimony-sulfur (Sb—S), antimony-selenium (Sb—Se), antimony-tellurium (Sb—Te), silicon-sulfur (Si—S), silicon-selenium (Si—Se), silicon-tellurium (Si—Te), germanium-sulfur (Ge—S), germanium-selenium (Ge—Se), germanium-tellurium (Ge—Te), tin-sulfur (Sn—S), tin-selenium (Sn—Se), tin-tellurium (Sn—Te), silver-sulfur (Ag—S), silver-selenium (Ag—Se), silver-tellurium (Ag—Te), aluminum-sulfur (Al—S), aluminum-selenium (Al—Se), aluminum-tellurium (Al—Te), gallium-sulfur (Ga—S), gallium-selenium (Ga—Se), gallium-tellurium (Ga—Te), indium-sulfur (In—S), indium-selenium (In—Se), and indium-tellurium (In—Te) based compounds, and compounds containing at least one selected from the group consisting of these elements.

Preferably, but not necessarily, the super resolution reproduction layer 350 is made of a phase change material based on germanium-antimony-tellurium (Ge—Sb—Te) or silver-indium-antimony-tellurium (Ag—In—Sb—Te).

Thus, the super resolution reproduction layer 350 creates a super resolution area at which a change in the temperature distribution or optical characteristics occurs at some regions of a beam spot due to a phase change at a predetermined temperature, thereby allowing the retrieval of information recorded in the form of a recording mark (m) having a magnitude of less than a resolving power.

As described above, the super resolution area at which a change in the temperature distribution or optical characteristics occurs by a reproduction beam is created at some regions of the reproduction beam spot, which may exist at the central portion of the beam spot.

The above-described information storage medium has been provided only for illustration of a super resolution phenomenon. Rather, according to the reproducing method of an aspect of the present invention, any type of an information storage medium that experiences super resolution phenomenon can be adopted.

A data reproducing method of an information storage medium according to an embodiment of the present invention will now be described.

Figure 4:
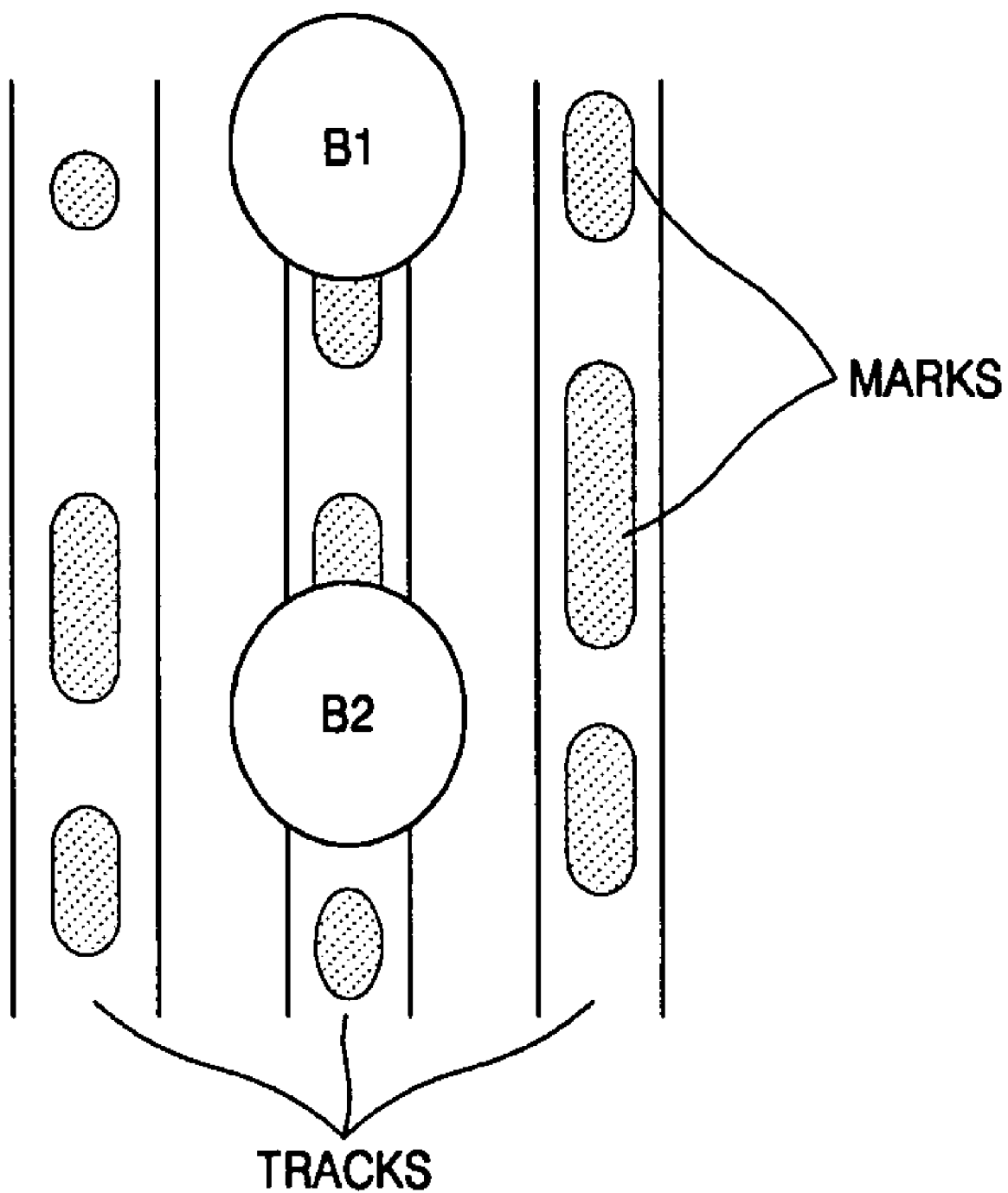
FIG. 4 illustrates a super resolution power beam and a non-super resolution power beam radiated onto an information storage medium in a data reproducing method according to an embodiment of the present invention.

In the data reproducing method of an information storage medium according to an aspect of the present invention, a first beam B1 having relatively high power and a second beam B2 having relatively low power are irradiated into the information storage medium, as shown in FIG. 4. Recording marks (m) are recorded along a track (T) of the information storage medium, and the first beam B1 and the second beam B2 are irradiated into different locations of the same track.

The first beam B1 and the second beam B2 may be produced by splitting a beam emitted from a single light source using a beam splitter or produced by two light sources for emitting beams of different power levels. The beam splitter may be a grating element or a diffraction element such as a hologram.

The first beam B1 has reproduction power in which a super resolution phenomenon occurs, which is called super resolution power, while the second beam B2 has reproduction power in which a super resolution phenomenon does not occur, which is called non-super resolution power. The first beam B1 and the second beam B2 are simultaneously irradiated.

Figure 5A:
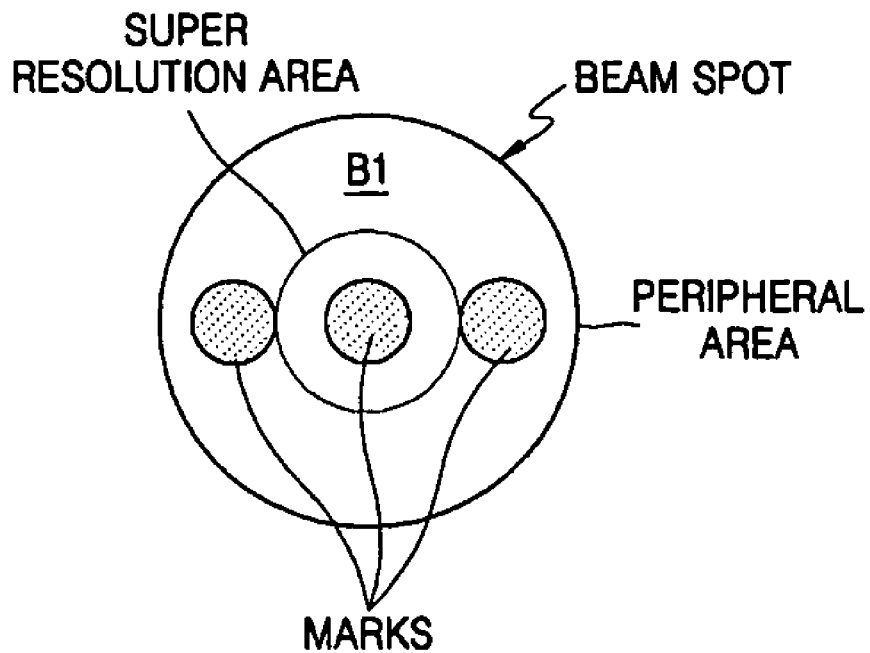
FIGS. 5A and 5B are enlarged views of beam regions of the super resolution power beam and the non-super resolution power beam radiated onto an information storage medium in the data reproducing method according to an embodiment of the present invention.
Figure 5B:
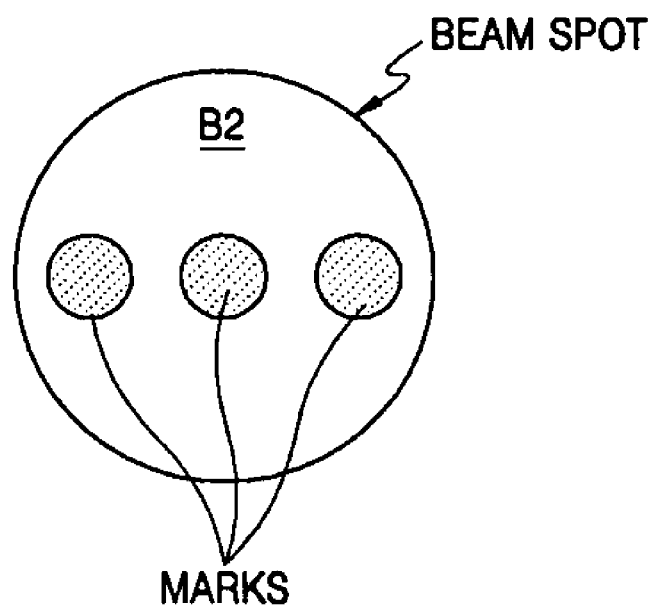

In a region with the first beam B1 irradiated thereto, as shown in FIG. 5A, a change in the temperature distribution or optical characteristics occurs in some area of an optical spot, thus forming a super resolution area where a super resolution phenomenon occurs. In a peripheral area of the super resolution area, the super resolution phenomenon does not occur. As shown in FIG. 5B, no super resolution phenomenon occurs at the region with the second beam B2 irradiated thereto.

When the wavelength of the first beam B1 is $\lambda$, and the numerical aperture thereof is NA1, the resolving power of the first beam B1 is $\lambda/(4*NA1)$. When a single light source is used to obtain the first and second beams B1 and B2, the wavelength of the second beam B2 is the same as that of the first beam B1, namely, $\lambda$, and the numerical aperture thereof is NA2, the resolving power of the second beam B2 is $\lambda/(4*NA2)$. The numerical aperture of a beam is defined as a value obtained by dividing the radius of the beam by a focal distance of an objective lens. An aspect of the present invention is based on the idea that only signals reflected from the super resolution area of the optical spot can be extracted by subtracting signals reflected from the peripheral area from signals reflected from the entire area of the optical spot.

Figure 2A:
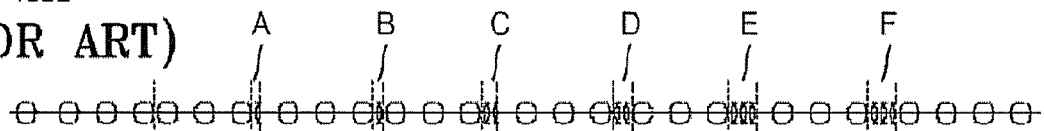
FIG. 2A illustrates a recording pattern in which marks having magnitudes less than a resolving power of a reproduction beam of super resolution power and marks having magnitudes greater than the resolving power are recorded.
Figure 2B:
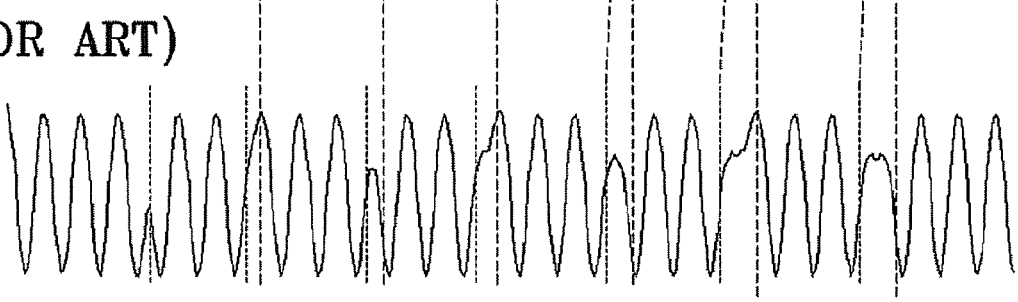
FIG. 2B illustrates an RF signal obtained by reproducing information recorded in the recording pattern of FIG. 2A using the reproduction beam of super resolution power.
Figure 6A:
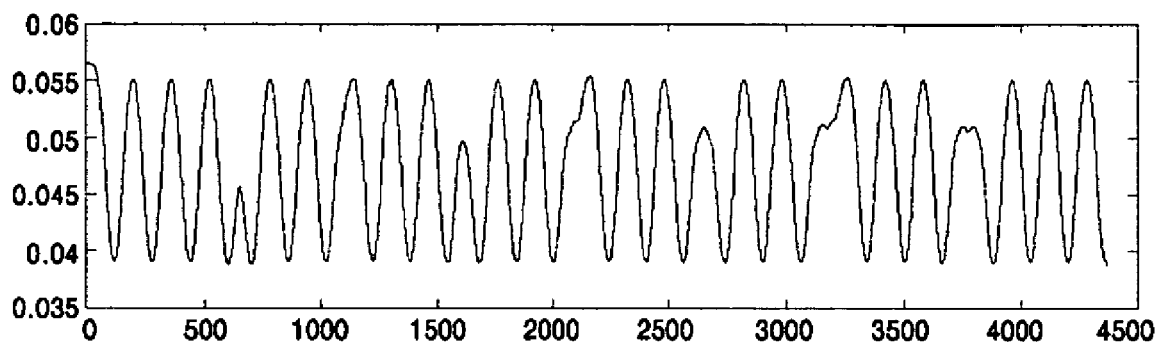
FIG. 6A illustrates a reproduction signal obtained by irradiating a super resolution power beam into marks recorded in the recording pattern shown in FIG. 2A by the data reproducing method according to an aspect of the present invention.
Figure 6B:
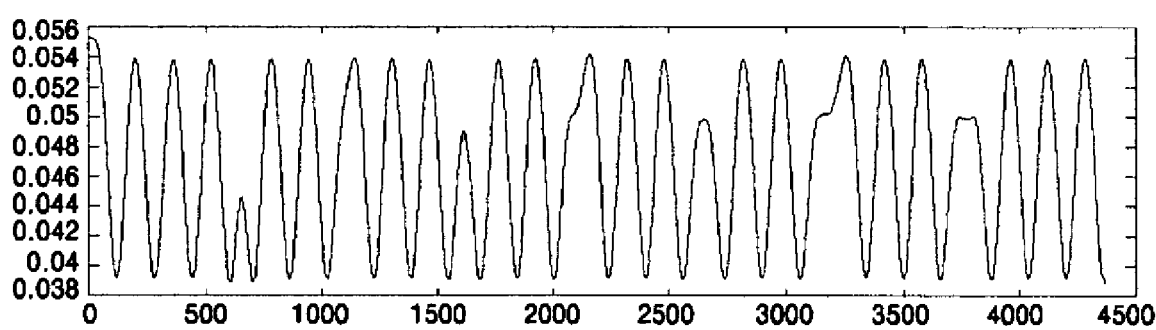
FIG. 6B illustrates a reproduction signal obtained by irradiating a non-super resolution power beam into marks recorded in the recording pattern shown in FIG. 2B by the data reproducing method according to an aspect of the present invention.
Figure 6C:
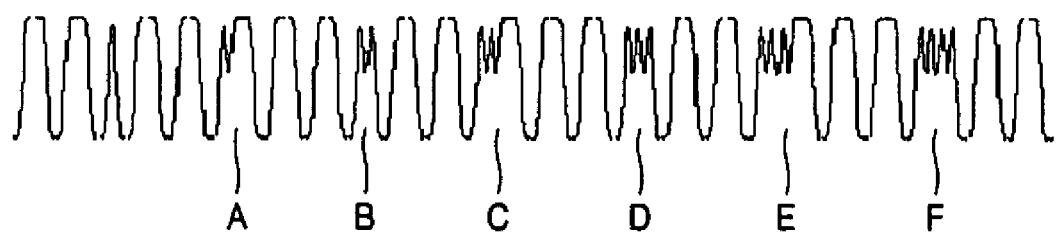
FIG. 6C illustrates a differential signal between the reproduction signals shown in FIGS. 6A and 6B.

FIG. 6A illustrates a first reproduction signal obtained by irradiating a super resolution power beam into marks recorded in the recording pattern shown in FIG. 2A by the data reproducing method according to an aspect of the present invention. FIG. 6B illustrates a second reproduction signal obtained by irradiating a non-super resolution power beam into the marks recorded in the recording pattern shown in FIG. 2A by the data reproducing method according to an aspect of the present invention. FIG. 6C illustrates a differential signal between the first reproduction signal and the second reproduction signal.

In other words, the first reproduction signal of FIG. 6A, into which the marks recorded in the pattern of FIG. 2A are reproduced, has the super resolution phenomenon. The second reproduction signal of FIG. 6B, into which the marks recorded in the pattern of FIG. 2A are reproduced, has no super resolution phenomenon.

A temporal delay of the first reproduction signal and the second reproduction signal is compensated for and operated by a differential signal, thereby obtaining the differential signal between the first reproduction signal and the second reproduction signal shown in FIG. 6C. Consequently, signal components reflected from the peripheral area of the beam spot are excluded from the differential signal, and only signal components from the super resolution area remain in the differential signal, thereby overcoming the problem of ISI caused by the peripheral area. Referring to FIG. 6C, 75 nm marks having magnitudes less than a resolving power and spaces therebetween are accurately reproduced as portions A, B, C, D, E, and F, and signal levels of portions A, B, C, D, E, and F are uniform irrespective of the numbers of marks and spaces. In addition, even when 300 nm marks and spaces are present next to the 75 nm marks and spaces, the signal levels of the 300 nm marks adjacent to the 75 nm marks are consistent with those of other 300 nm marks. Further, a flat area is shown at a high level and a low level with respect to 300 nm marks smaller than the overall beam spot size, suggesting that an effective beam for reproduction is reduced in size compared to the actual spot size.

Meanwhile, although it has been described and shown that the differential signal between the first reproduction signal and the second reproduction signal is used in the illustrative embodiment, a variety of operation techniques can be used.

Figure 7A:
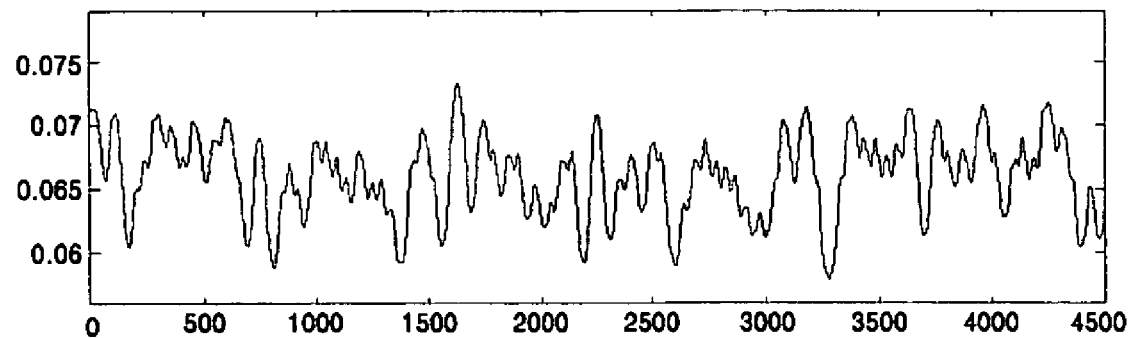
FIG. 7A illustrates a reproduction signal obtained by irradiating a super resolution power beam into a random mark recorded by the data reproducing method according to an aspect of the present invention.
Figure 7B:
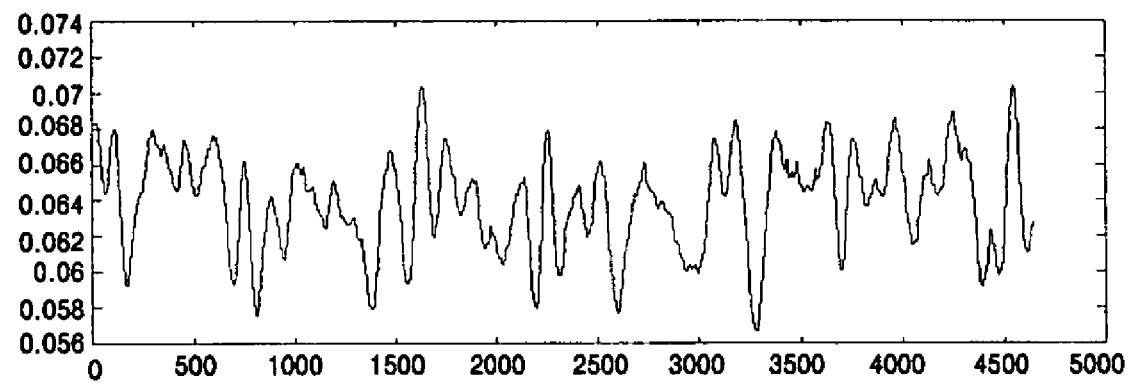
FIG. 7B illustrates a reproduction signal obtained by irradiating a non-super resolution power beam into a random mark recorded by the data reproducing method according to an aspect of the present invention.
Figure 7C:
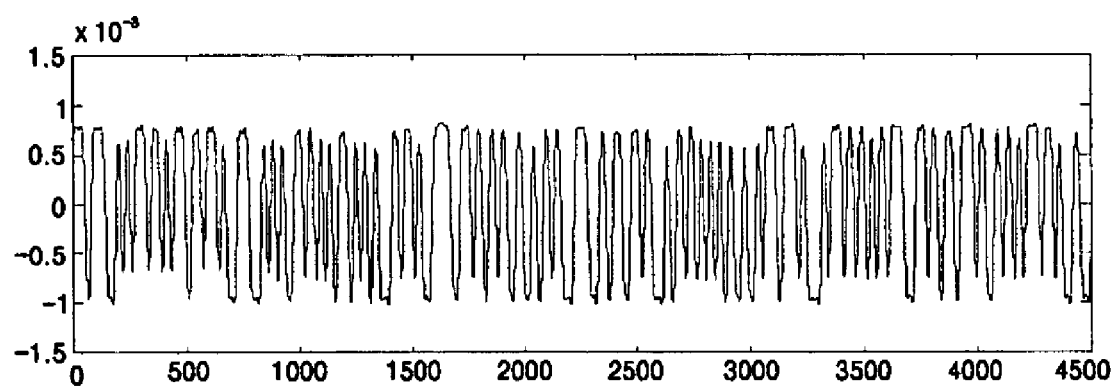
FIG. 7C illustrates a differential signal between the reproduction signals shown in FIGS. 7A and 7B.

FIGS. 7A, 7B and 7C illustrate results of reproduction of data recorded in a random recording pattern by the reproducing method according to an aspect of the present invention. FIG. 7A illustrates a first reproduction signal obtained by reproducing randomly recorded marks using a first power beam according to the data reproducing method of an aspect of the present invention, FIG. 7B illustrates a second reproduction signal obtained by reproducing the randomly recorded marks using a second power beam according to the data reproducing method of an aspect of the present invention, and FIG. 7C illustrates a differential signal between the first and second reproduction signals shown in FIGS. 7A and 7B. Because levels of the first and second reproduction signals of FIGS. 7A and 7B are not constant, a recording mark cannot be properly reproduced although the first and second reproduction signals are sliced at a predetermined level. On the other hand, the differential signal of FIG. 7C has a constant level, so if the differential signal is sliced at a predetermined level, a recording mark can be properly reproduced.

Figure 8:
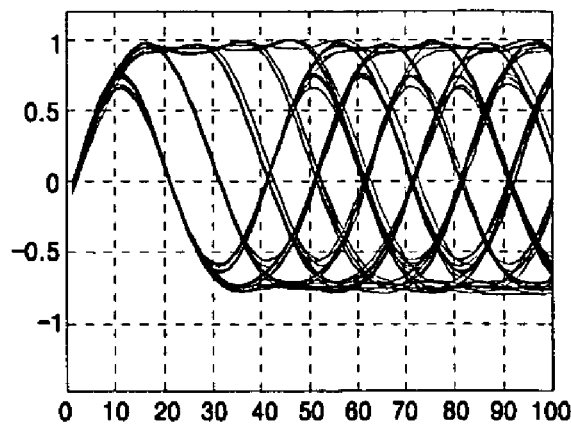
FIG. 8 illustrates an eye pattern obtained from the differential signal shown in FIG. 7C.

FIG. 8 illustrates an eye pattern obtained from the differential signal shown in FIG. 7C, showing good jitter characteristics of a reproduction signal. That is to say, the data reproducing method according to an aspect of the present invention can be effectively applied to the data recorded in a random recording pattern in a super resolution information storage medium.

In the data reproducing method according to an aspect of the present invention, a super resolution power beam and a non-super resolution power beam are irradiated with a predetermined temporal delay, and the temporal delay between a first reproduction signal based on the super resolution power beam and a second reproduction signal based on the non-super resolution power beam is compensated for and operated using the optimal operation technique. In such a manner, ISI arising from a peripheral area of a super resolution area in a reproduction beam spot can be solved, thereby improving reproduction signal characteristics in a simple manner.

Figure 9A:
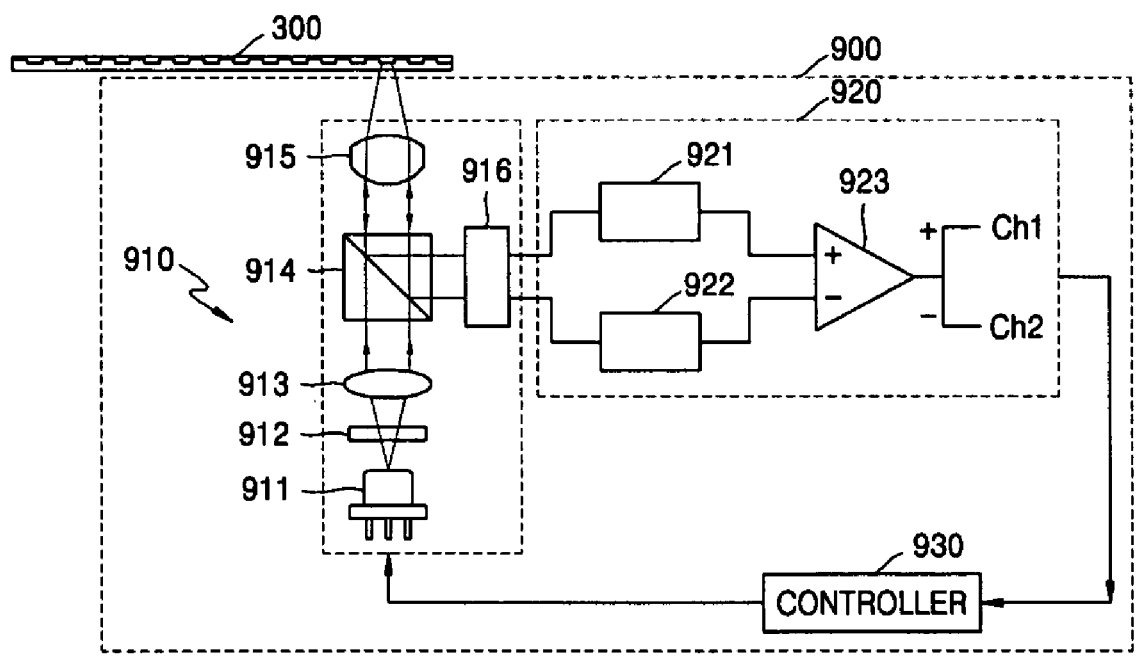
FIG. 9A schematically illustrates a data reproducing apparatus for a super resolution information storage medium, according to an embodiment of the present invention.

FIG. 9A schematically illustrates a data reproducing apparatus 900, which can perform a data reproducing method according to an aspect of the present invention.

The data reproducing apparatus 900 includes an optical pickup 910, a recording/reproduction signal processor 920, and a controller 930. More specifically, the optical pickup 910 includes a light source 911 for emitting beams, a diffraction element 912 for diffracting the beams emitted from the light source 911, a collimating lens 913 for collimating the beams having passed through the diffraction element 912, a beam splitter 914 for converting a traveling path of an incident beam, and an objective lens 915 for focusing the beam having passed through the beam splitter 914 onto the information storage medium 300.

The beam emitted from the light source 911 is split into a first beam and a second beam by the diffraction element 912. The power of the first beam and the power of the second beam can be adjusted by varying a diffraction pattern of the diffraction element 912. The diffraction element 912 may be a grating element or a hologram.

The first beam and the second beam reflected from the information storage medium 300 are reflected by the beam splitter 914 and received in a photodetector 916. The first beam and the second beam received in the photodetector 916 are converted into electrical signals and output as reproduction signals by the recording/reproduction signal processor 920.

The recording/reproduction signal processor 920 allows an amplifier 921 to amplify the first beam signal photoelectrically converted by the photodetector 916 and allows a compensator 922 to compensate for a temporal delay for the second beam signal photoelectrically converted by the photodetector 916. The reproduction signal of the first beam and the reproduction signal of the second beam are converted by an operation unit 923 to then be output as a radio frequency (RF) signal through a channel 1 (Ch1) and a push-pull signal through a channel 2 (Ch2).

In order to reproduce recording marks having magnitudes of less than a resolving power, the controller 930 controls the optical pickup 910 to emit either a super resolution power beam or a non-super resolution power beam according to material characteristics of the information storage medium 300. In addition, the controller 930 implements focusing servo and tracking servo using the RF signal and the push-pull signal.

The diffraction element 912 will now be described in greater detail. The first beam having super resolution power and the second beam having non-super resolution power must satisfy aberration amount conditions in addition to power conditions. In other words, the aberration amounts of the first and second beams are to be substantially identical. When the aberration amounts of the first and second beams are different, the shape of a spot formed on an information storage medium by the first beam is different from that of a spot formed on an information storage medium by the second beam. The different spot shapes formed by the first and second beams make it difficult, yet not impossible, to achieve aspects of the present invention.

To satisfy the power conditions and the aberration amount conditions for the first and second beams, a blaze-type grating element is used in the diffraction element 912 in an embodiment of the present invention.

Figure 9B:
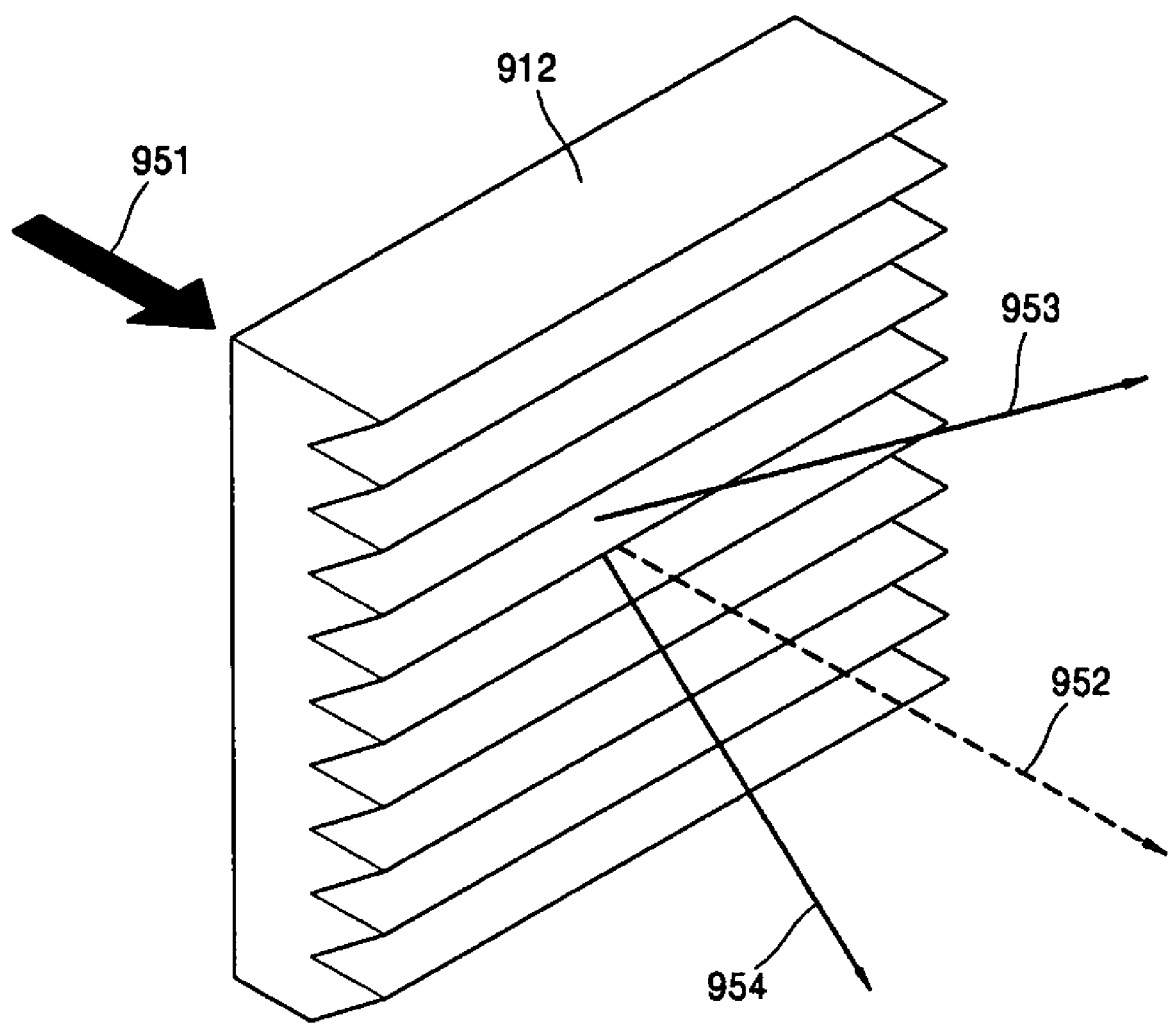
FIG. 9B illustrates a blazer type grating element according to an embodiment of the present invention.

FIG. 9B illustrates the blaze-type grating element 912 according to an embodiment of the present invention. When a beam 951 emitted from the light source 911 is incident upon the blaze-type grating element 912 of FIG. 9B, a plurality of diffracted beams, namely, a $0^{th}$-order diffracted beam 952, a $+1^{st}$-order diffracted beam 953, a $-1^{st}$-order diffracted beam 954, and $\pm 2^{nd}$-order through $\pm$Nth-order diffracted beams (not shown), are emitted from the blaze-type grating element 912. Here, N denotes an infinite integer in theory.

The aberration amounts of the $+1^{st}$-order diffracted beam 953 and the $-1^{st}$-order diffracted beam 954 are almost identical. The blaze-type grating element 912 may be easily implemented by one of ordinary skill in the art to which the present invention pertains so that the $+1^{st}$-order diffracted beam 953 has high power and the $-1^{st}$-order diffracted beam 954 has relatively lower power than the $+1^{st}$-order diffracted beam 953 or so that the $+1^{st}$-order diffracted beam 953 has low power and the $-1^{st}$-order diffracted beam 954 has relatively higher power than the $+1^{st}$-order diffracted beam 953. Meanwhile, the power of the $0^{th}$-order diffracted beam 952 is too weak and therefore negligible.

Figure 10:
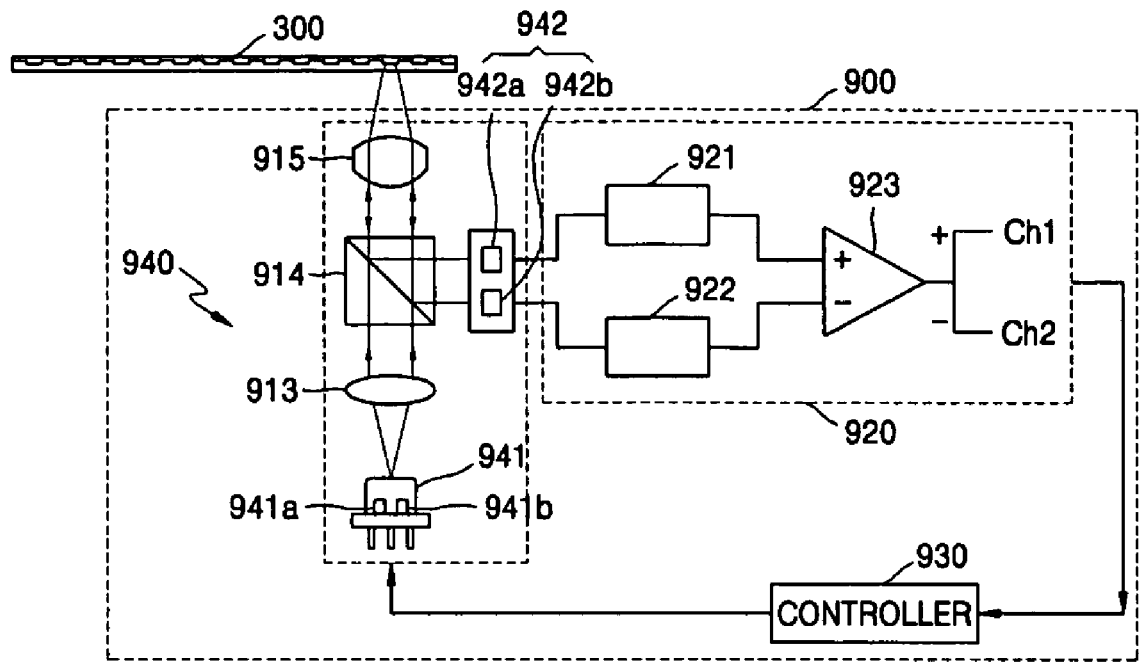
FIG. 10 schematically illustrates a modification of the data reproducing apparatus of FIG. 9A.

While the data reproducing apparatus 900 shown in FIG. 9A includes a diffraction element to produce a first beam and a second beam, it may include independent light sources, that is, a first light source 941a for emitting a super resolution power beam, i.e., the first beam, and a second light source 941b for emitting a non-super resolution power beam, i.e., the second beam, as shown in FIG. 10. In FIG. 10, the first light source 941a and the second light source 941b are packaged into an optical module. Alternatively, rather than forming the optical module, the first light source and the second light source may be independently provided and arranged at different locations. When the first light source and the second light source are independently provided in such a manner, it is not necessary to separately provide a diffraction element for producing the first and second beams.

In FIG. 10, the same functional elements are denoted by the same reference numerals as those shown in FIG. 9, and a detailed explanation will not be given.

Meanwhile, a photodetector 942 includes a first light detector 942a for receiving the first beam emitted from the first light source 941a and reflected from the information storage medium 300, and a second light detector 942b for receiving the second beam emitted from the second light source 941b and reflected from the information storage medium 300. A temporal delay between a first reproduction signal based on the first beam and a second reproduction signal based on the second beam is compensated using the compensator 922 and converted by the operating unit 923, thereby yielding an RF signal having excellent signal characteristics without ISI.

As described above, when the first light source and the second light source are independently provided, either the first light source or the second light source can be advantageously utilized as a light source for data recording. Further, the first light source and the second light source can be configured such that an optical pickup can be compatibly used for information storage media having different formats.

Up to now, embodiments of the present invention in which two beams, namely, a first beam having super resolution power and a second beam having non-super resolution power, are radiated onto a super resolution information storage medium have been described. However, in another embodiment of the present invention, a plurality of beams having non-super resolution power can be produced by a diffraction element or a plurality of light sources, and the plurality of beams having non-super resolution power together with a beam having super resolution power are radiated onto a super resolution information storage medium to reproduce data therefrom. In other words, after the plurality of beams having non-super resolution power and the beam having super resolution power are radiated onto the super resolution information storage medium, a final reproduction signal can be obtained using reproduction signals obtained from all of the beams having non-super resolution power, as shown in Equation 1:

$$\text{Final } RF \text{ signal} = RF_1 - (g_1 RF_2 + g_2 RF_3 + \ldots + g_{n-1} RF_N) \tag{1}$$

wherein $RF_1$ denotes a reproduction signal obtained from a beam having super resolution power, $RF_2$ through $RF_N$ denote reproduction signals obtained from (N−1) beams, and $g_1$ through $g_{N-1}$ are predetermined coefficients. The reproduction signals $RF_2$ through $RF_N$ have time delays from $RF_1$. The final RF signal shown in Equation 1 can be obtained by one of ordinary skill in the art to which the present invention pertains.

Figure 11:
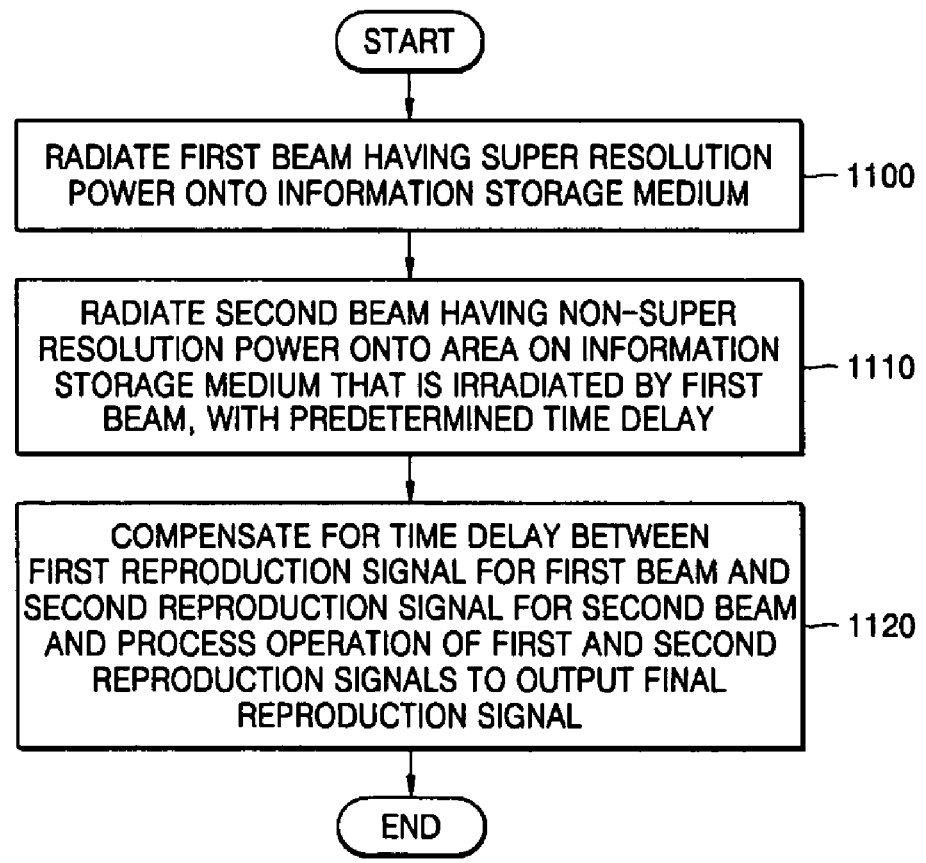
FIG. 11 is a flowchart illustrating a data reproducing method according to an embodiment of the present invention.

FIG. 11 is a flowchart illustrating a data reproducing method performed by the data reproducing apparatus 900 of FIG. 9A or 10. Referring to FIG. 11, first, the optical pickup 910 or 940 radiates the first beam having super resolution power onto the information storage medium 300, in operation 1100.

Next, in operation 1110, the optical pickup 910 or 940 radiates the second beam having non-super resolution power onto the area on the information storage medium 300 that is irradiated by the first beam, with a predetermined time delay. The radiation of the second beam with the predetermined time delay does not mean that the optical pickup 910 intentionally delays the radiation of the second beam but means that a time delay is naturally generated by the first beam first passing along a track and the second beam passing along the same track after the first beam.

In operation 1120, the recording/reproduction signal processor 920 compensates for a time delay between the first reproduction signal for the first beam radiated onto the information storage medium 300 and reflected thereby and the second reproduction signal for the second beam radiated onto the information storage medium 300 and process an operation, such as, a subtraction of the second reproduction signal from the first reproduction signal to output a final reproduction signal.

When super resolution reproduction can be achieved with high power, and the second reproduction signal is subtracted from the first reproduction signal, the characteristics of a signal resulting from the subtraction are degraded if not accurately considering the time delay between the first and second reproduction signals. More specifically, the first reproduction signal is obtained from spot 1, which enables super resolution reproduction with high power, and the second reproduction signal is obtained from spot 2, which enables general reproduction with low power. Then, subtraction is performed by the amplifier 921 of FIG. 9A or 10 giving an appropriate gain to the second reproduction signal. At this time, the delay unit 922 controls a time delay between the first and second reproduction signals caused by a spatial distance between the two spots 1 and 2. If the time delay between the first and second reproduction signals is not accurate, a signal resulting from the subtraction has poor characteristics. Of course, the time delay can be obtained from the spatial distance between the spots 1 and 2, but various external disturbances may occur during disc reproduction. For example, if a rotational speed of a spindle motor slightly changes or either a radial or tangential tilt occurs, the spatial distance between spots on an actual disc may change. If the change of the spatial distance between spots is not adequately adjusted, a final reproduction signal has a poor quality.

Figure 12:
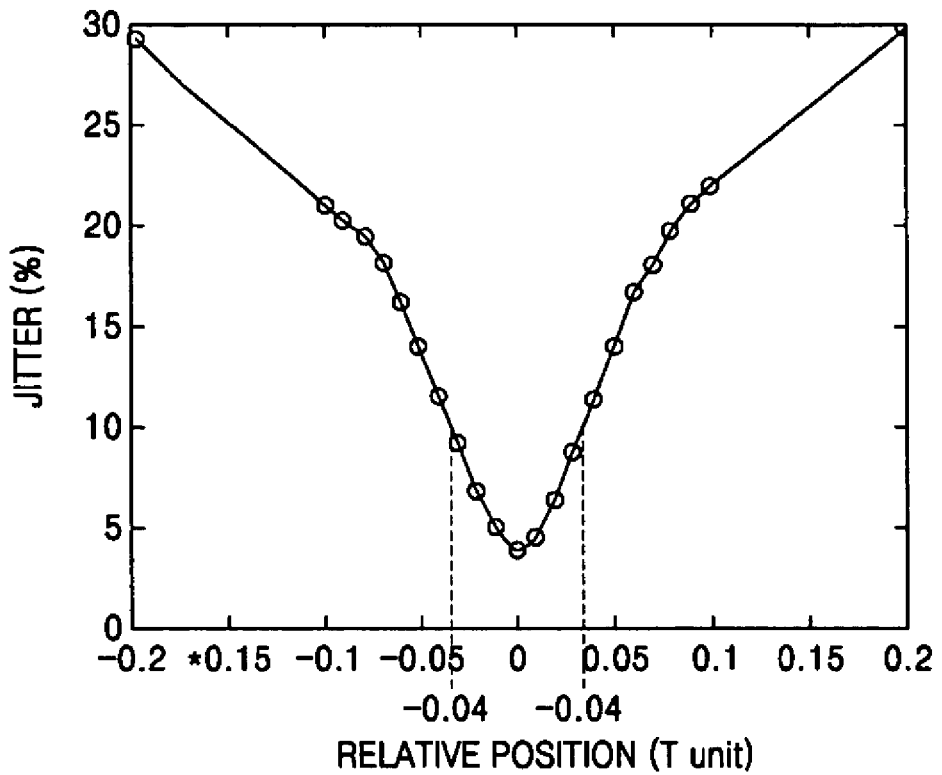
FIG. 12 is a graph illustrating results obtained by simulating jitter of a signal after a subtraction according to delay time.

FIG. 12 is a graph illustrating results obtained by simulating jitter of a signal subjected to a subtraction according to delay time. In the simulation of FIG. 12, a linear speed of a spot was 5 m/s. when the jitter was 10%, a margin of ±0.04T was obtained. Because the margin of ±0.04T corresponds to ±0.03 nsec, the delay time margin of ±0.04T is vary narrow, and accordingly, a unit capable of accurately controlling the delay time is needed.

The time delay between the first and second reproduction signals can be accurately controlled using the following methods: first, using jitter or bER; second, using pre-pits or predetermined discrimination information; and third, using a wobble signal. In the method using a wobble signal, inconsecutive points of the wobble signal can be used.

First, the method using jitter or bER to accurately control the time delay between the first and second reproduction signals will be described. In this method, jitter or bER of a final reproduction signal obtained based on the first and second reproduction signals is monitored, and the time delay between the first and second reproduction signals is compensated for so that the monitored jitter or bER is minimized.

Figure 14:
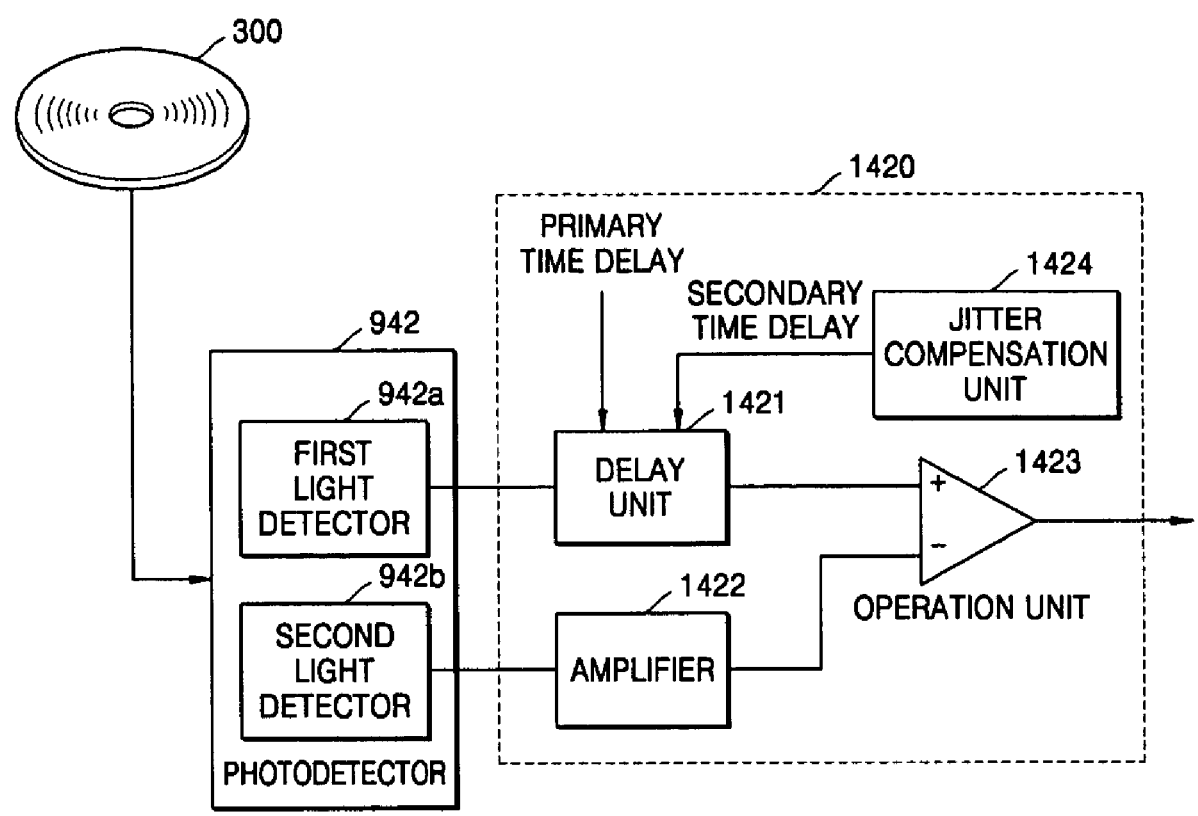
FIG. 14 illustrates a modification of the recording/reproduction signal processor of the data reproducing apparatus of FIG. 9A or 10, the modified signal performing compensation using a jitter value.

FIG. 14 illustrates a signal processor 1420, which is a modification of the recording/reproduction signal processor 920 of the data reproducing apparatus 900 of FIG. 9A or 10, the signal processor 1420 performing a compensation using the jitter of the final reproduction signal. Referring to FIG. 14, light of the first beam reflected from the information storage medium 300 is detected by a first light detector 942a, and light of a second beam reflected from the information storage medium 300 is detected by a second light detector 942b.

A delay unit 1421 of the signal processor 1420 receives the light output by the first light detector 942a, delays the received light for a first delay time to compensate a time delay between spot 1 from the first light detector 942a and spot 2 from the second light detector 942b, and provides the delayed light to an operation unit 1423. An amplifier 1422 of the signal processor 1420 receives the light output by the second light detector 942b, amplifies the received light, and provides the amplified light to the operation unit 1423. The operation unit 1423 subtracts the second reproduction signal from the first reproduction signal.

Figure 13:
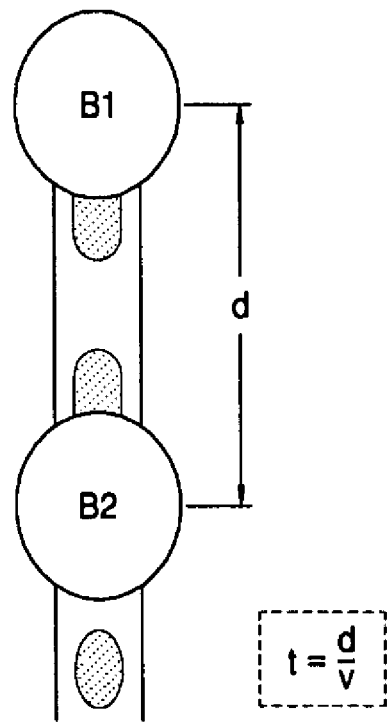
FIG. 13 illustrates a calculation of a first delay time used in the reproducing method of FIG. 11.

The first delay time (t) is obtained by dividing a distance (d) between the first spot B1, formed by the first beam, and the second spot B2, formed by the second beam by a linear speed (v) of the first spot as shown in FIG. 13. The delay unit 1421 can primarily compensate for the time delay between the first spot and the second spot by delaying the first reproduction signal for the first delay time.

In the embodiment of FIG. 14, the delay unit 1421 secondarily compensates for the time delay between the first and second spots using a jitter value. To be more specific, a jitter compensation unit 1424 monitors the jitter or bER of a final reproduction signal output from the operation unit 1423, calculates a compensation value that minimizes the jitter or bER, obtains a second delay time by adding or subtracting the compensation value from the first delay time, and provides the second delay time to the delay unit 1421. Then, the delay unit 1421 delays the first reproduction signal for the second delay time, Accurately adjusting the time delay between the first and second spots.

Figure 15:
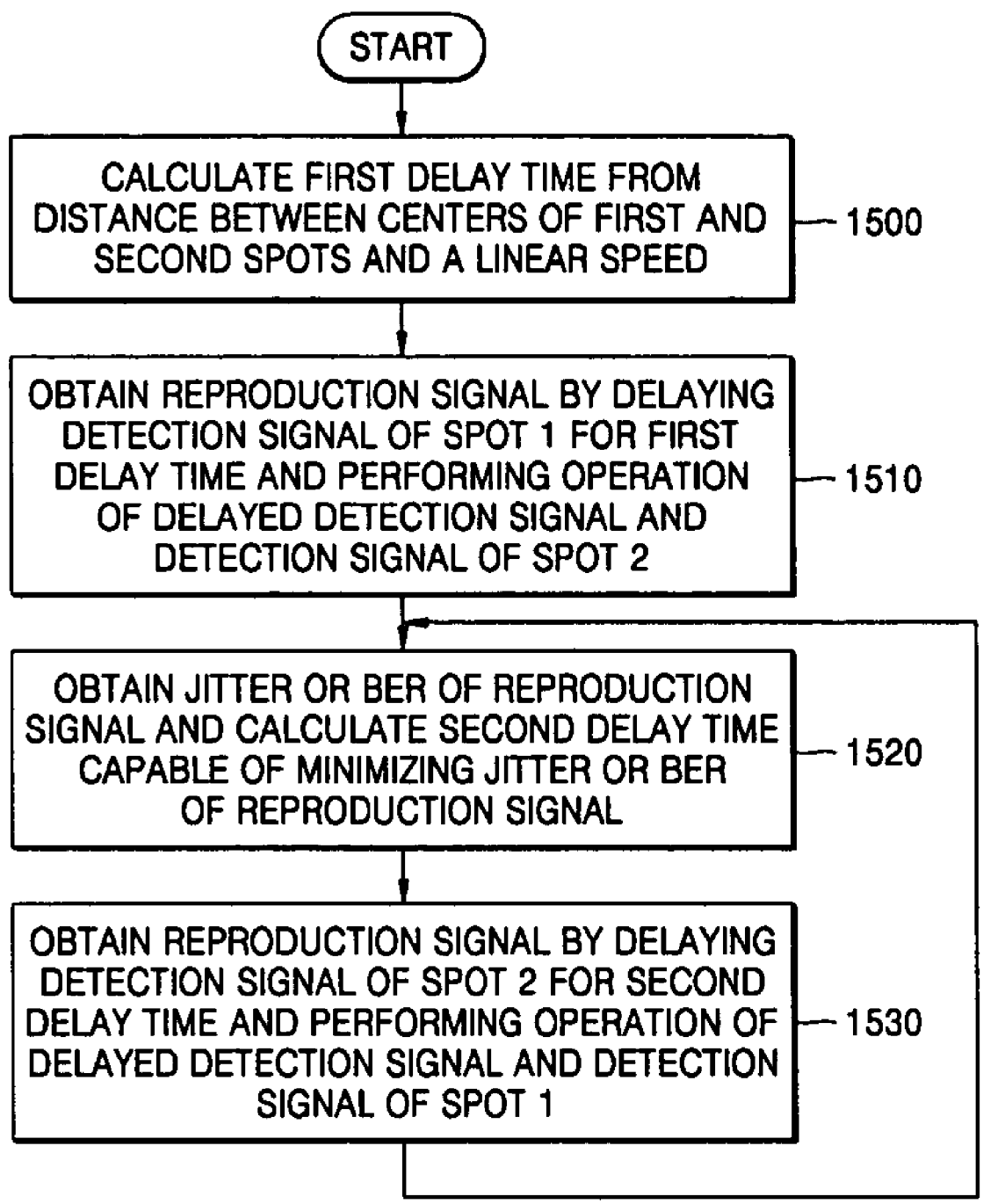
FIG. 15 is a flowchart illustrating a method of compensating for the time delay between a first beam and a second beam using a jitter value, according to an embodiment of the present invention.

FIG. 15 is a flowchart illustrating a method of compensating for the time delay between the first and second beams using a jitter value, according to an embodiment of the present invention. Referring to FIG. 15, in operation 1500, the first delay time is calculated from a distance between centers of the first and second spots and a linear speed of the spots.

Next, in operation 1510, a reproduction signal is obtained by delaying a detection signal of spot 1 for the first delay time and performing an operation of the delayed detection signal and a detection signal of spot 2.

In operation 1520, the jitter or bER of the reproduction signal is obtained, and a second delay time capable of minimizing the jitter or bER of the reproduction signal is calculated.

In operation 1530, a reproduction signal is obtained by delaying the detection signal of spot 2 for the second delay time and performing an operation of the delayed detection signal and a detection signal of spot 1.

A method of accurately compensating for a time delay between the first and second beams using pre-pits or predetermined discrimination information will now be described with reference to FIGS. 16 and 17. The predetermined discrimination information denotes additional information recorded periodically to easily distinguish additional data from user data.

Figure 16:
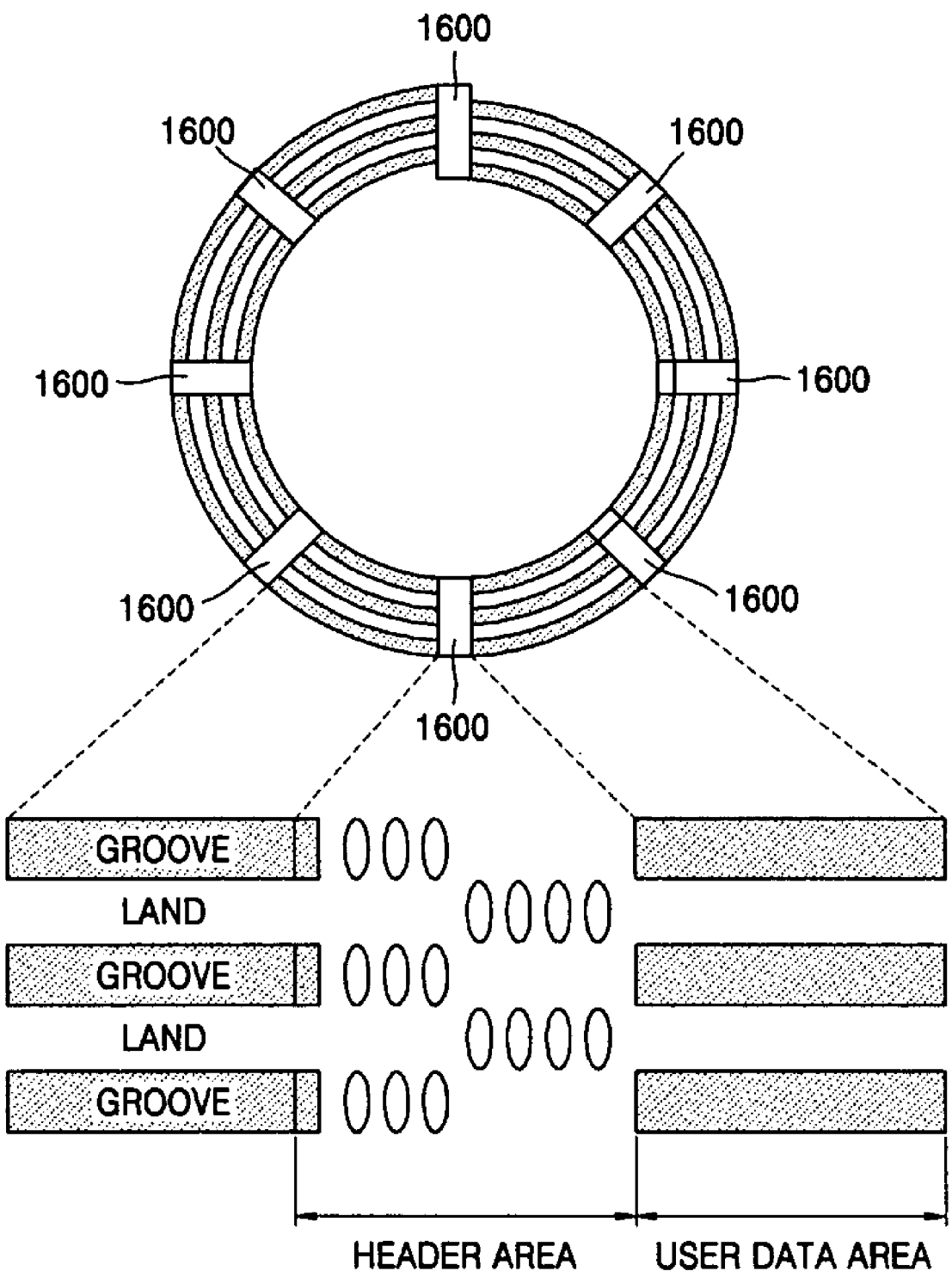
FIG. 16 illustrates a super resolution information storage medium having tracks, in predetermined areas of which pre-pits are produced.

First, a pre-pit is described in brief with reference to FIG. 16. FIG. 16 illustrates a super resolution information storage medium having tracks, in predetermined areas of which pre-pits are produced.

An optical recording medium, such as a DVD-RAM, includes a header area in which header information is stored and a user data area in which user data is recorded. In DVD-RAMs, each sector stores 128-byte header information, which is recorded as pre-pits when a disc substrate is manufactured. A pickup can recognize a sector number, a sector type, a land track/groove track, etc. from the header information recorded in the header area comprised of pre-pits. Also, the pickup can perform servo control using the header information. In other words, a header area in which uneven pre-pits are formed is disposed in a predetermined area of each sector. A pickup included in a recording/reproduction apparatus can easily access a desired location on a disc using information recorded in the header area.

Referring to FIG. 16, land tracks and groove tracks, which correspond to a user data area where user data is recorded, are formed on a super resolution information storage medium to which an aspect of the present invention is applied. Header areas 1600, where header information is recorded as pre-pits, are also formed on the super information storage medium.

As described above, to store header information, a header area formed of pre-pits may be formed on a predetermined area of even the super resolution information storage medium as shown in FIG. 16.

Figure 17:
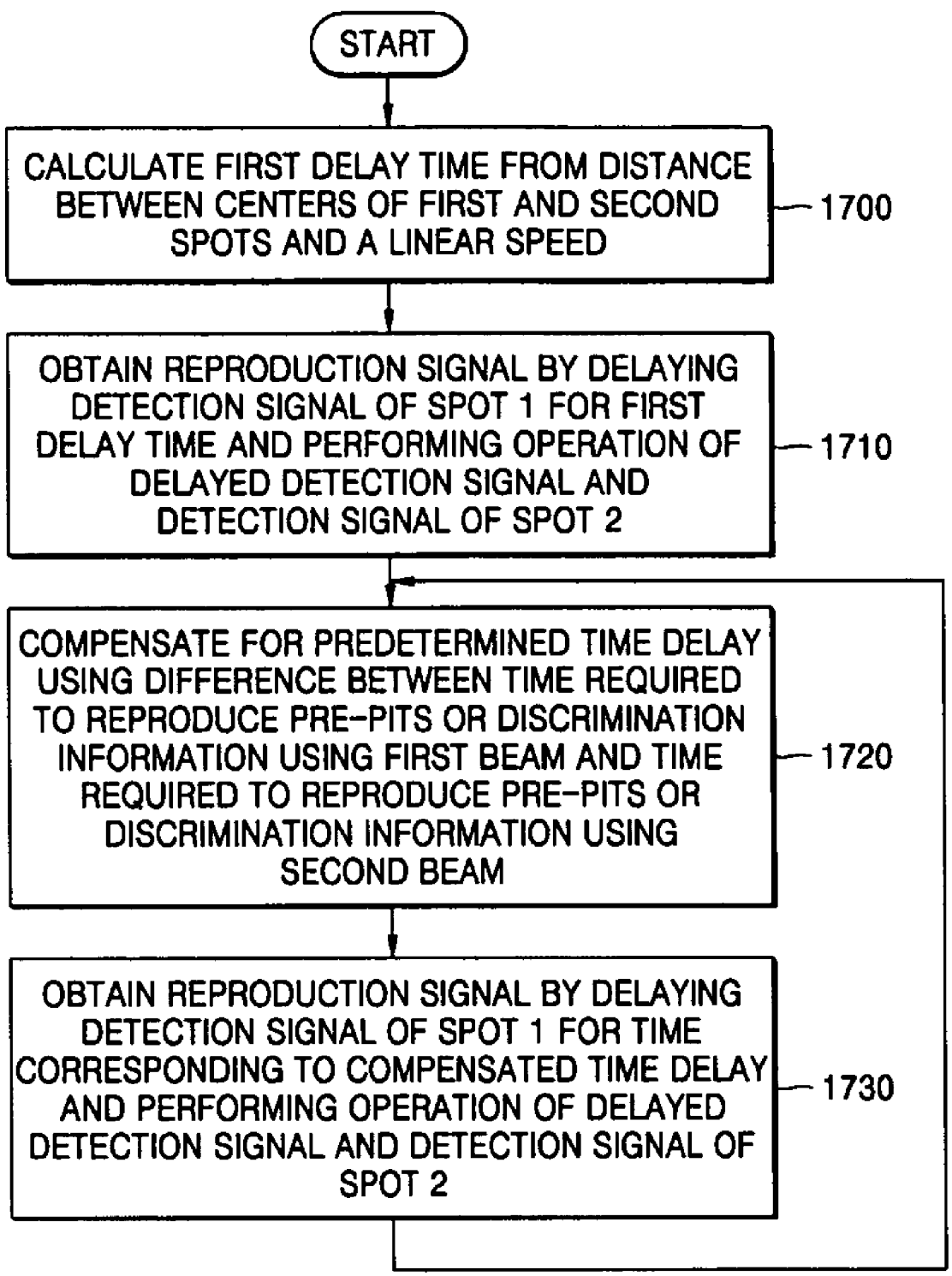
FIG. 17 is a flowchart illustrating a method of compensating for the time delay between the first and second beams using pre-pits or discrimination information, according to another embodiment of the present invention.

FIG. 17 is a flowchart illustrating a method of compensating for the time delay between the first and second beams using pre-pits or discrimination information, according to another embodiment of the present invention.

First, in operation 1700, the first delay time is calculated from the distance between the centers of the first and second spots and a linear speed of spots.

Next, in operation 1710, a reproduction signal is obtained by delaying a detection signal of spot 1 for the first delay time and performing an operation of the delayed detection signal and a detection signal of spot 2.

Then, in operation 1720, a time delay between the first and second beams is compensated for using a difference between the time required to reproduce pre-pits or discrimination information using the first beam and the time required to reproduce the pre-pits or discrimination information using the second beam.

Thereafter, in operation 1730, a reproduction signal is obtained by delaying the detection signal of spot 1 for the time corresponding to the compensated time delay and performing an operation of the delayed detection signal and a detection signal of spot 2.

As described above, when pre-pits or additional identification information other than user data are recorded, a time from when the pre-pits or identification information is reproduced by a preceding beam and when the pre-pits or identification information is reproduced by a following beam can be used as a delay time.

In the data reproducing method of a super resolution information storage medium according to the aspect of the present invention, as described above, signal components from a peripheral area other than a super resolution area, where a change in the temperature distribution or optical characteristics by irradiating a reproduction beam having relatively high power, are removed when reproducing data recorded in the form of marks, thereby enhancing reproduction signal characteristics. Furthermore, a method of controlling a time delay is used to accurately control a distance between spots, thereby obtaining a more accurate reproduction signal. These methods allow for improvement in characteristics of a signal obtained by reproducing data recorded in a random pattern, thereby contributing to increased practicality of super resolution information storage media.

Also, the data reproducing apparatus of a super resolution information storage medium according to an aspect of the present invention enables improvement of reproduction signal characteristics by simply processing a signal without requiring significant changes to existing reproducing apparatuses.

Use of the data reproducing method and apparatus according to an aspect of the present invention improves data reproduction performance of a super resolution information storage medium, thereby achieving practical use of high-quality, high-density, high-capacity information storage media.

While the super resolution information storage medium to which the reproducing method according to an aspect of the present invention has been described as having a multiple-layer structure of five or seven layers formed on a substrate and that a super resolution layer is made of a specific material, the described embodiments are to be considered in all respects only as illustration. Rather, the aspects of the present invention may be applied to various types of information storage media undergoing a super resolution phenomenon.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of reproducing data recorded in a super resolution information storage medium in marks having magnitudes less than a resolving power of an incident light beam, the method comprising:

irradiating a first beam along a track in which the data is recorded, wherein the first beam causes a super resolution phenomenon which changes a temperature distribution or an optical property in a central portion of a beam spot;

irradiating a second beam along the track in which the data is recorded, wherein the second beam does not cause the super resolution phenomenon;

detecting a first reproduction signal based on the first beam and a second reproduction signal based on the second beam; and performing a differential operation on the first reproduction signal and the second reproduction signal to obtain a final reproduction signal.

2. The data reproducing method of claim 1, wherein the performance of the differential operation further comprises compensating for a temporal delay between the first reproduction signal and the second reproduction signal.

3. The data reproducing method of claim 2, wherein signal components reflected from peripheral areas of the first and second beams are excluded from the differential signal.

4. The data reproducing method of claim 2, wherein only signal components from a super resolution area remain in the differential signal.

5. The data reproducing method of claim 1, wherein the first beam and the second beam are irradiated on a same track with a time delay.

6. The data reproducing method of claim 1, wherein the irradiating of the first and second beams comprises splitting a beam emitted from a single light source into the first beam and the second beam using a diffraction element.

7. The data reproducing method of claim 6, wherein in the splitting of the beam emitted from the single light source, a $+N^{th}$-order diffracted beam among a plurality of diffracted beams produced by the diffraction element is used as the first beam, and a $-N^{th}$-order diffracted beam is used as the second beam, wherein N is an integer $\geq 1$.

8. The data reproducing method of claim 7, wherein the diffraction element is a blaze-type grating element.

9. The data reproducing method of claim 6, wherein in the splitting of the beam emitted from the single light source, a $-N^{th}$-order diffracted beam among the plurality of diffracted beams produced by the diffraction element is used as the first beam, and a $-N^{th}$-order diffracted beam is used as the second beam, wherein N is an integer $\geq 1$.

10. The data reproducing method of claim 9, wherein the diffraction element is a blaze-type grating element.

11. The data reproducing method of claim 1, wherein the irradiating of the first and second beams comprises emitting the first beam and the second beam from independent light sources including a first light source and a second light source, respectively.

12. The data reproducing method of claim 1, wherein aberration amounts of the first and second beams are substantially identical.

13. A method of reproducing data recorded in a super resolution information storage medium in marks having magnitudes less than a resolving power of an incident light beam, the method comprising:
    irradiating a first beam along a track in which the data is recorded, wherein the first beam causes a super resolution phenomenon which changes a temperature distribution or an optical property in a central portion of a beam spot;
    irradiating a plurality of second beams along the track irradiated by the first beam, with a predetermined time delay, wherein the plurality of second beams do not cause the super resolution phenomenon; and
    detecting a final reproduction signal by performing a differential operation on a first reproduction signal from the first beam and a second reproduction signal from the second beam.

14. The data reproducing method of claim 13, wherein the detecting of the final reproduction signal comprises compensating for the predetermined time delay between the first reproduction signal and the second reproduction signal.

15. The data reproducing method of claim 14, wherein the detecting of the final reproduction signal further comprises compensating for the predetermined time delay between the first reproduction signal and the second reproduction signal.

16. The data reproducing method of claim 14, wherein the detecting of the final reproduction signal further comprises compensating for the predetermined time delay so that jitter or bER of the final reproduction signal is minimized.

17. The data reproducing method of claim 14, wherein the detecting of the final reproduction signal further comprises compensating for the predetermined time delay using a difference between a time required to reproduce pre-pits or identification information, which is not used as user data, using the first beam and the time required to reproduce the pre-pits or identification information using the second beam.

18. The data reproducing method of claim 14, wherein the detecting of the final reproduction signal further comprises compensating for the predetermined time delay using a wobble signal.

19. The data reproducing method of claim 13, further comprising splitting a beam emitted from a single light source into the first beam of super resolution power and the plurality of second beams of non-super resolution power using a diffraction element.

20. An apparatus for reproducing data recorded in a super resolution information storage medium in marks having magnitudes less than a resolving power of an incident light beam, the apparatus comprising:
    an optical pickup irradiating a first beam along a track in which the data is recorded, wherein the first beam causes a super resolution phenomenon which changes a temperature distribution or an optical property in a central portion of a beam spot and irradiating a second beam along the track in which the data is recorded, wherein the second beam does not cause the super resolution phenomenon;
    a signal processor detecting a first reproduction signal for the first beam and a second reproduction signal for the second beam; and
    a controller performing a differential operation on the first reproduction signal and the second reproduction signal to obtain a final reproduction signal.

21. The data reproducing apparatus of claim 20, wherein the performance of the differential operation further comprises compensating for a temporal delay between the first reproduction signal and the second reproduction signal.

22. The data reproducing apparatus of claim 20, wherein the first beam and the second beam are irradiated on the same track with a time delay.

23. The data reproducing apparatus of claim 20, wherein the optical pickup comprises:
    a light source; and
    a diffraction element splitting a beam emitted from the light source into the first beam and the second beam.

24. The data reproducing apparatus of claim 23, wherein the first beam corresponds to a $+N^{th}$-order diffracted beam among a plurality of diffracted beams produced by the diffraction element, and the second beam corresponds to a $-N^{th}$-order diffracted beam, wherein N is an integer $\geq 1$.

25. The data reproducing apparatus of claim 24, wherein the diffraction element is a blaze-type grating element.

26. The data reproducing apparatus of claim 23, wherein the first beam corresponds to a $-N^{th}$-order diffracted beam among the plurality of diffracted beams produced by the diffraction element, and the second beam corresponds to a $+N^{th}$-order diffracted beam, wherein N is an integer $\geq 1$.

27. The data reproducing apparatus of claim 26, wherein the diffraction element is a blaze-type grating element.

28. The data reproducing apparatus of claim 20, wherein the optical pickup includes a first light source emitting the first beam and a second light source emitting the second beam.

29. An apparatus reproducing data recorded in a super resolution information storage medium in marks having magnitudes less than a resolving power of an incident light beam, the apparatus comprising:
    an optical pickup irradiating a first beam along a track in which the data is recorded, wherein the first beam causes a super resolution phenomenon which changes a temperature distribution or an optical property in a central portion of a beam spot and irradiating a plurality of second beams along the track irradiated by the first beam, with a predetermined time delay, wherein the plurality of second beams do not cause the super resolution phenomenon; and
    a signal processor detecting a final reproduction signal by performing a differential operation on a first reproduction signal from the first beam and the second reproduction signal from the second beams; and
    a controller controlling the optical pickup using the final reproduction signal received from the signal processor.

30. The data reproducing apparatus of claim 29, wherein the detecting of the final reproduction signal further comprises compensating for the predetermined time delay between the first reproduction signal and the second reproduction signal.

31. The data reproducing apparatus of claim 30, wherein the signal processor further comprises a compensation unit compensating for the predetermined time delay between the first reproduction signal and the second reproduction signal.

32. The data reproducing apparatus of claim 31, wherein the compensation unit compensates for the predetermined time delay using a difference between a time required to reproduce pre-pits or identification information, which is not used as user data, using the first beam and the time required to reproduce the pre-pits or identification information using the second beam.

33. The data reproducing apparatus of claim 31, wherein the compensation unit compensates for the predetermined time delay using a wobble signal.

34. The data reproducing apparatus of claim 31, wherein the compensation unit compensates for the predetermined time delay so that jitter or bER of the final reproduction signal is minimized.

35. The data reproducing apparatus of claim 29, wherein the optical pickup comprises:

a light source; and a diffraction element splitting a beam emitted from the light source into the first beam and the second beam.

36. The data reproducing apparatus of claim 29, wherein the optical pickup includes a first light source emitting the first beam and a second light source emitting the second beam.

* * * * *